United States Patent [19]

Over et al.

[11] 3,913,322
[45] Oct. 21, 1975

[54] INTERNAL COMBUSTION ENGINES

[75] Inventors: Charles Edward Over, Betchworth, England; Milford Melvin Scott, Las Vegas, Nev.

[73] Assignee: Kinematics Limited, Betchworth, England

[22] Filed: Aug. 29, 1973

[21] Appl. No.: 392,444

[52] U.S. Cl. ............... 60/278; 60/293; 60/304; 123/119 A; 137/513.3
[51] Int. Cl.[2] ............................................. F01N 3/10
[58] Field of Search ............ 60/293, 304, 289, 290, 60/278; 137/513.3; 123/119 A

[56] References Cited
UNITED STATES PATENTS

| | | | |
|---|---|---|---|
| 2,131,957 | 10/1938 | Kadenacy | 60/314 |
| 2,345,569 | 4/1944 | Flint | 60/293 |
| 2,854,816 | 10/1958 | Bodine | 60/293 |
| 3,186,311 | 6/1965 | Carlson | 137/513.3 |
| 3,237,399 | 3/1966 | Hamblin | 60/289 |
| 3,237,615 | 3/1966 | Daigh | 60/278 |
| 3,287,899 | 11/1966 | Bintz | 60/290 |
| 3,542,003 | 10/1970 | Sarto | 60/278 |
| 3,662,541 | 5/1972 | Sawada | 60/293 |
| 3,844,260 | 10/1974 | Scott | 123/119 A |
| 3,866,586 | 2/1975 | Scott | 123/119 A |

*Primary Examiner*—Douglas Hart
*Attorney, Agent, or Firm*—Pierce, Scheffler & Parker

[57] ABSTRACT

An internal combustion engine having, in communication with the exhaust system at a position where changes in exhaust gas pressure occur during running of the engine, a valve constructed and arranged so that when the pressure in the exhaust system is sub-atmospheric the valve takes up an open condition to admit air into the exhaust system, and when the pressure in the exhaust system is super-atmospheric the valve takes up an at least partially closed condition, the said position being such that at least some of the air admitted to the exhaust system through the valve will be drawn back into the engine cylinders.

2 Claims, 3 Drawing Figures

INTERNAL COMBUSTION ENGINES

This invention relates to internal combustion engines and provides means for improving one or more of certain operating characteristics of the engine. These characteristics include, for example:

i. fuel consumption
ii. minimum usable octane rating of the fuel
iii. piston ring and cylinder wear
iv. lubricating oil consumption
v. content of oxides of nitrogen in the exhaust gases.

According to the invention an internal combustion engine has, in communication with the exhaust system at a position where changes in exhaust gas pressure occur during running of the engine (e.g. with the exhaust manifold, heat riser or header pipe), a valve constructed and arranged so that when the pressure in the exhaust system is sub-atmospheric the valve takes up an open condition to admit air into the exhaust system, and when the pressure in the exhaust system is super-atmospheric the valve takes up an at least partially closed condition, the position of the valve being such that some of the air admitted through it into the exhaust system will be drawn back into the engine cylinders.

The invention should not be confused with arrangements which have previously been proposed for admitting air through a valve into the exhaust system of an internal combustion engine to act as secondary air for reaction with incompletely burnt fuel or fuel products, such as carbon monoxide, in an afterburner or catalytic convertors or equivalent device downstream of the valve. Although the present invention is applicable to engines equipped with an afterburner, catalytic converter or like device, it is also applicable to engines which do not have such devices and, as further explained herein, may improve the exhaust emission characteristics of such engines.

Although the invention does not depend on the correctness of any particular theoretical explanation of how it achieves its results, the following is put forward as a possible explanation.

When the engine is idling, there are negative and positive pressures in the exhaust system. The valve is actuated by the differential pressures between the exhaust system and the atmosphere so that, when there is a negative or sub-atmospheric pressure in the exhaust system, the value opens and allows fresh ambient air to enter the exhaust system, preferably via the intake air cleaner which keeps foreign objects from entering. Some of this fresh air is drawn back from the exhaust system into the cylinders and mixed with the air/fuel mixture in the cylinders during the valve overlap period. This reduces fuel consumption during idling by reducing the charge dilution due to exhaust gas being drawn back into the cylinders during the valve overlap period. During cruise or steady speeds, the valve is fluttering, allowing fresh air to enter the exhaust system and some of this air, although a lesser amount than when idling, to be drawn back into the cylinders, thus reducing the fuel/air ratio, giving better performances and mileage per lb. of fuel. During deceleration, when negative pressure in the exhaust system is predominant, the valve opens fully, which reduces the pumping action in the cylinders by allowing fresh air to enter the exhaust system and be drawn back into the cylinders which in turn reduces the vacuum on the idling portion of the carburettor or other fuel supply system, thereby reducing fuel flow during deceleration. Allowing fresh air to enter the exhaust system and be drawn back into the cylinders during deceleration also decreases the pumping action of the piston rings in worn grooves, which reduces the flow of oil past the piston rings, thereby greatly decreasing the smoking exhibited by worn engines when the throttle is opened after deceleration. The reduction of this pumping action also reduces oil consumtion. During acceleration, the valve is pushed tightly against its seat because the exhaust system pressure is positive or super-atmospheric.

In one form of the invention the valve is never wholly closed and is connected to the combustion air intake of the engine by a passage and is adapted to set up oscillation of the air or gas in this passage when the valve is in a partially closed condition, e.g. during acceleration. This oscillation, which may be likened to the oscillation in the airflow caused by the reed or sound-producing aperture of a wind musical instrument, appears to influence the inflowing combustion air in some way, possibly by setting up a sympathetic oscillation or increasing turbulence, thereby breaking down fuel droplets, increasing fuel vaporisation and providing a more homogeneous fuel/air mixture.

The valve may comprise a thin, ligh disc which has at least one gas flow aperture in an area thereof which is unobstructed by seating against which the disc seats when in the partially closed condition. For example, the valve may be in the form of a circular disc having a ring of large apertures near its periphery, which disc is free to move axially in a shallow cylindrical chamber having a large diameter passage at one end which opens into the exhaust system and a smaller diameter passage at the opposite end which opens to the atmosphere, preferably into the engine combustion air intake passage, either between the air cleaner and the carburettor or other fuel supply device or downstream of the latter. These passages open into the said cylindrical chamber through the centres of the two ends wall thereof so that the openings are surrounded by flat ledges which serve as seatings for the disc at the end positions of its axial movement. The ledge around the larger diameter passage opening is radially narrow and so does not obstruct the large apertures near the periphery of the disc. On the other hand, the ledge around the smaller diameter passage opening is wide enough to obstruct those apertures completely when the valve is in that respective end position. However, in the central part of the disc where it is clear of the wide ledge there is provided a small aperture or a group of small apertures. The passage of the exhaust gas through the small aperture or apertures in the central portion of the disc sets up the said oscillation of the air or gas in the passage leading to the combustion air intake of the engine. This oscillation is of high energy, and is believed to shatter fuel droplets in the intake system and increase fuel vaporisation. The exhaust gas which passes out through the small aperture or apertures in the disc is drawn into the intake manifold and dilutes the intake charge but not to a deleterious extent. This dilution reduces the peak cylinder pressure and flame temperature. By reducing the peak pressure the instantaneous hammering and expansion of the piston rings caused by this instantaneous high pressure getting behind the piston rings forcing them hard against the cylinder walls is reduced, so that piston rings and cylinder wall wear are also reduced. By reducing the peak flame temperature the formation of oxides of nitrogen is greatly reduced. By reducing the instantaneous peak pressure and flame temperature, it is possible to use a low-leaded or other low-octane petrol because detonation (pinking) and preignation are caused by peak cylinder pressure and temperatures. A valve of the kind described is believed to be novel per se, and the invention also embraces the valve as such. Thus, according to another aspect of the invention a valve comprises a circular disc having a ring of apertures near its periphery, which disc is free to move axially in a cylindrical chamber having a central passage of relative large diameter surrounded by a relatively narrow flat ledge at one end and a smaller diameter central passage surrounded by a relatively wide flat ledge at the opposite end, the said ledges serving as seatings for the disc at the end positions of its axial movement, the radial dimension of the narrower ledge being such that it does not obstruct the said apertures near the periphery of the disc, and the radial dimension of the wider ledge being such that it completely obstructs those apertures when the disc is seated on the wider ledge, and the disc having in its central portion where it is clear of the wider ledge an aperture or group of apertures having a total cross-sectional area less than that of the said apertures near the periphery of the disc.

It is also possible to instal a venturi in the passage connecting the valve to the combustion air intake of the engine, with a tube leading from the venturi throat to a water reservoir. When the valve is in its partially closed condition, e.g. during acceleration, the flow of exhaust gas through the venturi creates a vacuum in the venturi throat which draws water from the reservoir through the tube. The hot exhaust gas will vaporise the water before reaching the combustion air intake. On the other hand, when the valve is in its open condition, e.g. during deceleration, some of the water will enter the exhaust system and be vaporised therein, and will enter the cylinders during the overlap period, thus reducing carbon build up and undesirable emissions.

The invention may be performed in various ways and a specific embodiment will now be described by way of example with reference to the accompanying drawings, in which.

Figure 1:
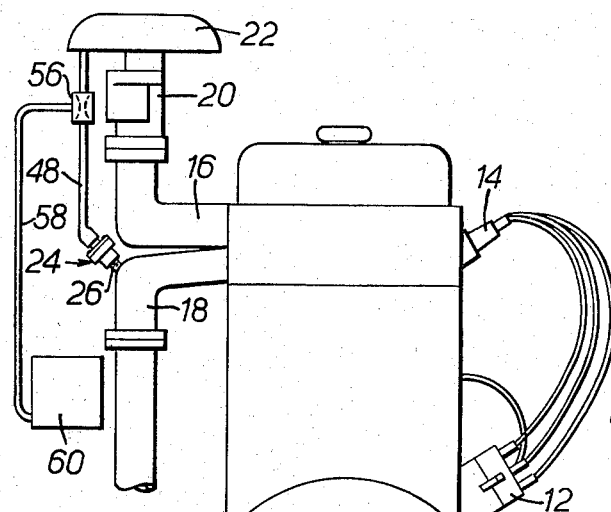
FIG. 1 shows an internal combustion engine embodying the invention.

FIG. 1 shows an internal combustion engine 10 of the spark ignition type having a distributor 12 and spark plugs 14. The engine also has a combustion air intake manifold 16 and an exhaust manifold 18. Mounted on the intake manifold 16 there is a carburettor 20 which receives combustion air from the atmosphere via an air cleaner 22. As so far described, the engine and the components mentioned are conventional.

In accordance with the invention, a valve 24 is fitted to the exhaust manifold. This may be done by drilling and tapping a hole in the exhaust manifold, screwing in a short length of pipe 26 having a threaded outer end, and screwing the valve 24 on to the outer end.

Figure 2:
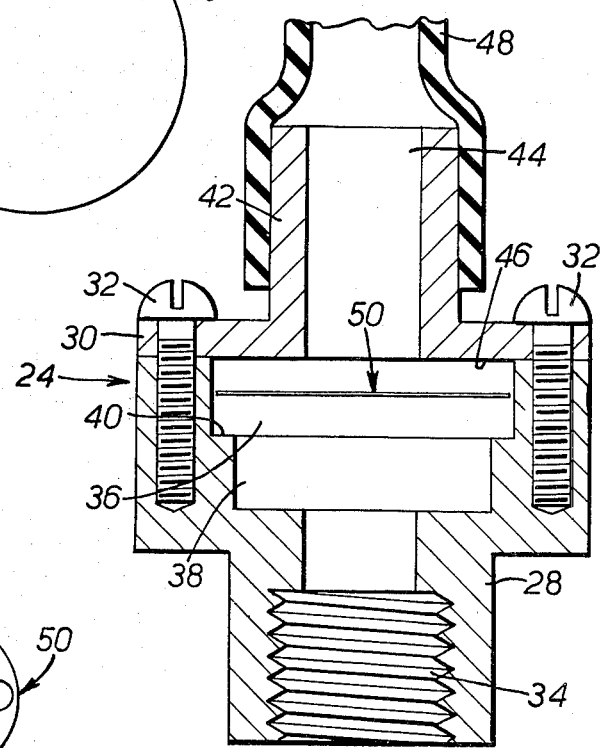
FIG. 2 is a cross-section of a valve embodying the invention as fitted to the engine shown in FIG. 1.

Referring now to FIG. 2, the valve 24 comprises a body portion 28 to which a cover portion 30 is secured by screws 32. In the lower end of the body portion 28 there is an internally screw-threaded recess 34 to receive the outer end of the pipe 26 for connecting the valve 24 to the exhaust manifold 18. Within the body portion 28 there is a shallow cylindrical chamber 36. The recess 34 communicates with the lower end of the chamber 36 through a passage 38 which is of relatively large diameter where it opens into the chamber 36, the opening being surrounded by a narrow flat ledge 40 which forms the lower end wall of the chamber 36.

The cover portion 30 has an upwardly projecting spigot 42 with a passage 44 therethrough opening into the upper end of the chamber 36. The diameter of the passage 44 is smaller than the diameter of the upper end of the passage 38 so that where the passage 44 opens into the chamber 36 it is surrounded by a flat ledge 46 which is substantially wider than the ledge 40. The ledge 46 forms the upper end wall of the chamber 36.

Fitted to the spigot 42 there is a flexible tube 48, made of a suitable temperature-resistant elastomer such as neoprene. Referring to FIG. 1, the upper end of this tube 48 is fitted to a nipple (not shown) fixed to the air cleaner 22 so that the tube 48 places the interior of the valve 24 in communication with the interior of the air cleaner 22.

Figure 3:
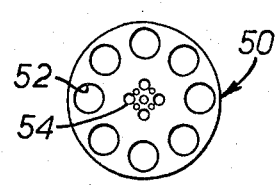
FIG. 3 is a plan view of the disc of the valve.

Referring again to FIG. 2, the chamber 36 contains a disc 50 made of a piece of thin corrosionresistant sheet metal such as stainless steel. The disc 50 is free to move up and down in the chamber 36. The disc is shown in more detail in FIG. 3. Near the periphery of the disc there is a ring of large apertures 52, in this embodiment each 0.188 inches in diameter. In the centre of the disc there is a group 54 of smaller apertures. In this embodiment there are nine apertures in the group 54, of two diifferent sizes. The four larger ones are each 0.082 inches in diameter, while the five smaller ones are each 0.059 inches in diameter. When the disc is in its lowermost position, resting on the narrow flat ledge 40, the larger apertures 52 are only slightly obstructed by the ledge 40. On the other hand, when the disc is in its uppermost position, against the wide flat ledge 46, the large apertures 52 are wholly obstructed by the ledge 46. In all positions of the disc, the central group of apertures 54 remain unobstructed.

When the pressure in the exhaust manifold 18 is persistently sub-atmospheric, the disc 50 is in its lowest or open condition, resting on the narrow ledge 40, and fresh air will be drawn into the manifold 18 from the atmosphere through the air cleaner 22, the tube 48 and all the apertures in the disc 50. On the other hand, when the pressure in the exhaust manifold 18 is persistently super-atmospheric, the disc 50 will be blown up against the wide ledge 46, its partially closed condition, and some exhaust gas will pass through the central group of apertures 54, the tube 48 and into the air cleaner 22. In its passage through the apertures 54, oscillation is produced in the manner previously described, and this oscillating stream of exhaust gas is recycled into the cylinders via the carburettor 20. When the pressure in the exhaust manifold is fluctuating or at an intermediate level, the disc will flutter in the chamber 36, allowing some air to enter the exhaust manifold but in a lesser amount than when the disc is resting on the lower ledge 40.

The position of the point of attachment of the valve 24 to the exhaust manifold should be as close as practicable to where the exhaust passages from the individual cylinders join the common portion of the manifold, to ensure that when air is being drawn into the exhaust manifold through the valve 24, some of this air can be drawn back into the engine cylinders during some of the time when the exhaust valves are open.

It has been found that by merely varying the number of the larger (0.082 inch diameter) holes in the central group 64 in the disc, the valve can be made suitable for use for virtually the whole range of automobile engines in normal use, as shown by the following table.

TABLE

| No. of 0.082 inch holes | Cyl. volume (cc) | 4 cyl. engine volume (cc) | 6 cyl. engine volume (cc) | 8 cyl. engine volume (cc) |
| --- | --- | --- | --- | --- |
| 1 | 150–330 | 600–1320 | — | — |
| 2 | 330–510 | 1320–2040 | 1980–3060 | 2640–4080 |
| 3 | 510–690 | 2040–2760 | 3060–4140 | 4080–5520 |
| 4 | 690–870 | 2760–3480 | 4140–5220 | 5520–6960 |
| 5 | 870–1050 | — | — | 6960–8400 |

In a modification, illustrated diagrammatically in FIG. 1, a venturi 56 is inserted in the tube 48, an inlet aperture at the throat of the venturi communicating via a line 58 with a water reservoir 60.

We claim:

1. An internal combustion engine having cylinders, a combustion air intake and an exhaust system;

a valve comprising a housing having means defining a first opening and a second opening;

first passage means connecting said first opening to said combustion air intake;

second passge means connecting said second opening to said exhaust system at a position in said exhaust system where changes in exhaust gas pressure occur during running of said engine; and a valve element within said housing movable in response to a pressure drop between said first opening and said second opening to a first end condition affording free flow of a gaseous medium from said first opening to said second opening, and movable in response to a pressure drop between said second opening and said first opening to a second end condition affording a restricted flow of a gaseous medium from said second opening to said first opening, said housing having a first seating for said valve element in said first end condition and a second seating for said valve element in said second end condition;

said valve element comprising a disc movable between said seatings and having at least one gas flow aperture therethrough in an area thereof which is unobstructed by either of said seatings when said disc is in either of said end conditions, and at least one other gas flow aperture therethrough in an area thereof which is unobstructed by said first seating when said disc is in said first end condition but is obstructed by said second seating when said disc is in said second end condition; whereby when the pressure in said exhaust system is subatmospheric said valve admits air into said exhaust system at said position, said position being such that at least some of said air will be drawn back from said exhaust system into said cylinders, and whereby when the pressure in said exhaust system is super-atmospheric said valve element is in said second end condition.

2. An internal combustion engine as defined in claim 1 wherein said disc has a ring of apertures near its periphery and is free to move axially in a cylindrical chamber within said housing, said chamber having a central passage of relatively large diameter communicating with said second opening and surrounded by a narrow flat ledge at one end thereof and a smaller diameter central passage communicating with said first opening and surrounded by a wide flat ledge at the opposite end thereof, said ledges serving as said seatings for said disc at the end positions of said axial movement, said apertures near the periphery of said disc being substantially unobstructed by said narrow ledge when said disc is seated thereagainst but being completely obstructed by said wide ledge when said disc is seated thereagainst and said disc having in a central portion thereof where clear of said wide ledge at least one other aperture, the cross-sectional area of said at least one other aperture being less than the total cross-sectional areas of said apertures near the periphery of said disc.

* * * * *